Dec. 2, 1969     R. J. ANETSBERGER     3,481,518
BOAT AND LUGGAGE CARRIER
Filed July 20, 1967     2 Sheets-Sheet 1
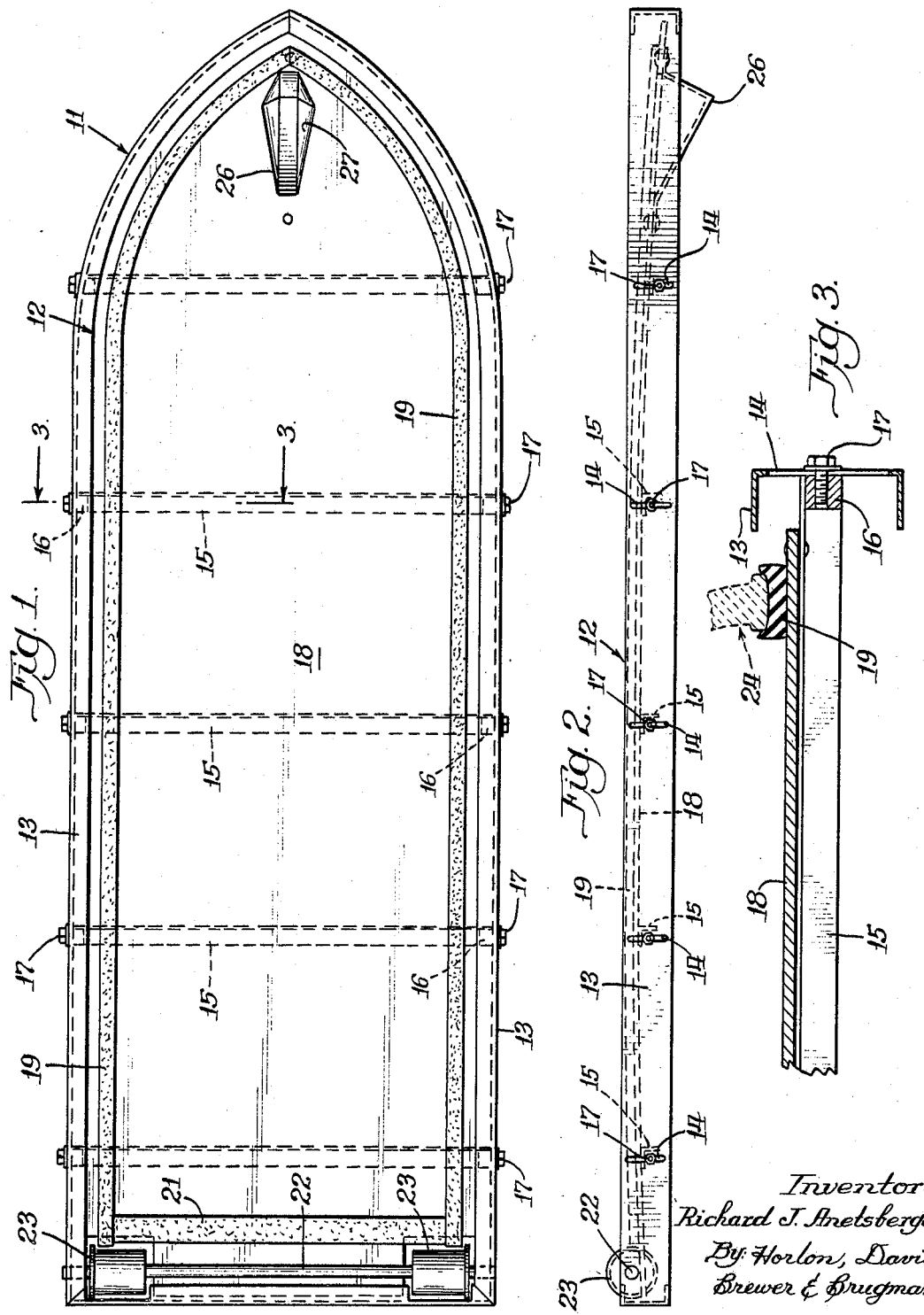
Inventor
Richard J. Anetsberger
By Horton, Davis,
Brewer & Brugman
Attys.

Dec. 2, 1969 R. J. ANETSBERGER 3,481,518
BOAT AND LUGGAGE CARRIER
Filed July 20, 1967 2 Sheets-Sheet 2
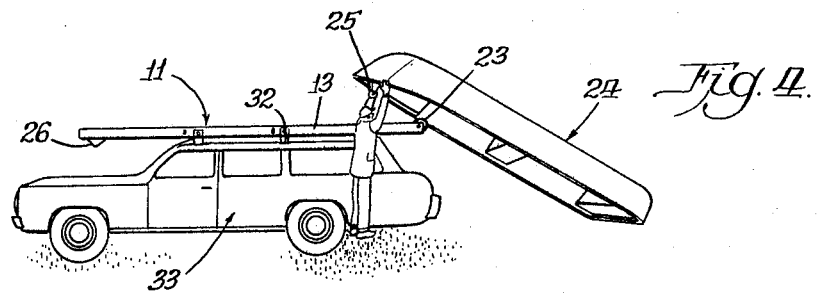
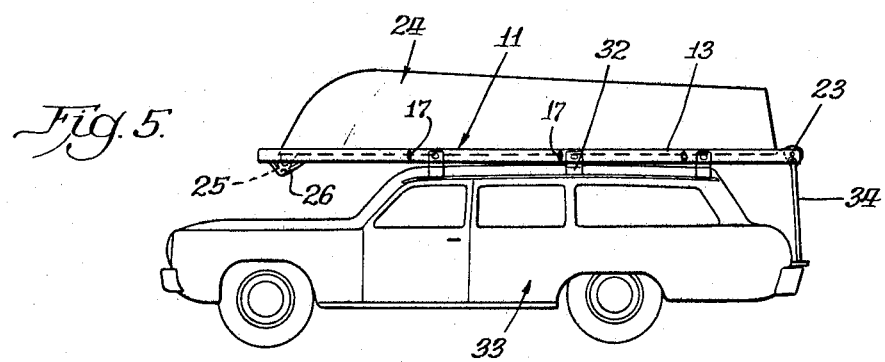
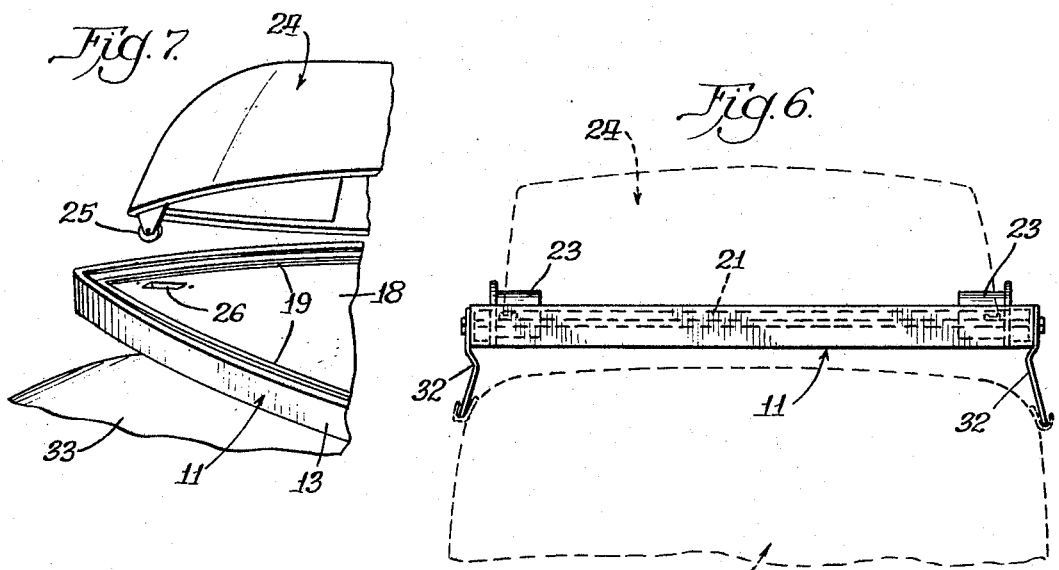
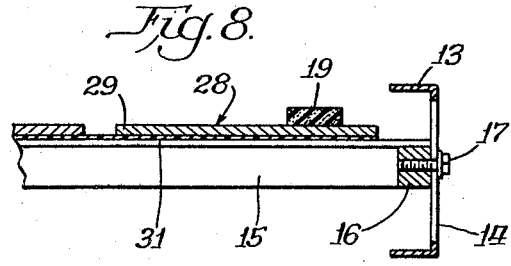
Inventor:
Richard J. Anetsberger
By Horton, Davis,
Brewer & Brugman
Attys

United States Patent Office 3,481,518
Patented Dec. 2, 1969

3,481,518
BOAT AND LUGGAGE CARRIER
Richard J. Anetsberger, % Anetsberger Brothers Inc.,
Anets Drive, Northbrook, Ill. 60062
Filed July 20, 1967, Ser. No. 654,869
Int. Cl. B60r 9/04
U.S. Cl. 224—42.1                                        3 Claims

ABSTRACT OF THE DISCLOSURE

Carrier removably attachable to top of automobile comprising a frame and platform adjustably mounted thereon to accommodate different lengths and gunnel contours of standard small boats, especially those for use with outboard motors, wherein rollers on frame and boat enable one-man placement of boat on platform and removal therefrom, and boat forms weather-proof storage compartment with platform, also usable as sleeping quarters.

BACKGROUND OF THE INVENTION

Field of the invention

The invention relates generally to transporting a boat on an automobile, and more particularly to combination boat and luggage carriers.

Description of the prior art

Carriers of the prior art for a boat on the roof of a stock automobile seriously affect performance of the car, especially because of the air turbulence and resulting drag thereby created. This is true both with those which function solely to carry a boat and those in which luggage may be stored with the boat mounted in inverted position over the luggage. The only suggestions made in the prior art for substantially reducing such seriously objectionable drag and additionally providing effective weatherproofing of the luggage compartment so defined are to employ a unique and specially designed boat and a complementally shaped roof for the vehicle, but this is very expensive and does not enable transportation on any stock automobile of standard small boats.

SUMMARY OF THE INVENTION

This invention eliminates such objectionable features of the prior art and provides an inexpensive and efficient boat and luggage carrier for transporting standard small boats of different lengths and gunnel contours on any stock automobile which functions somewhat as an airfoil to substantially eliminate air turbulence and drag, and comprises a frame removably attachable to the top of any stock automobile and a platform adjustably mounted thereon to accommodate boats of different lengths and variable gunnel contours, with a wheel on the prow of the boat and rollers at the rear of the frame to enable one-man placement of the boat in inverted position on the platform and removal therefrom, the platform having a well for receiving the prow wheel and sealing gasket means engageable by the boat gunnels to provide a weatherproof compartment for luggage. When mounted on the platform, a boat may be tilted laterally to facilitate luggage placement on, or removal from, the platform, and the compartment may be used as sleeping quarters when the boat is propped up in such tilted position. Also, if desired, removal of the boat will permit a specially designed tent to be mounted on the platform.

In the drawings:

FIGURE 1 is a plan view of a boat and luggage carrier embodying the features of my invention;

FIG. 2 is a side elevation of the carrier of FIG. 1;

FIG. 3 is a detail vertical sectional view taken substantially on the line 3—3 of FIG. 1;

FIG. 4 is a perspective view illustrating a first step in placing a boat on a carrier which is mounted on an automobile;

FIG. 5 is a side elevational view showing a boat mounted in traveling position on a carrier on a vehicle;

FIG. 6 is a rear end elevation, as seen from the right side of FIG. 5, with the automobile and the boat shown in broken lines;

FIG. 7 is a detail perspective view of the front portion of the carrier and boat with the latter tilted to raised, luggage-receiving position; and FIG. 8 is a detail vertical section similar to FIG. 3 of a modified form of boat and luggage carrier.

DESCRIPTION OF THE PREFERRED EMBODIMENTS

Referring more particularly to FIGS. 1–3, reference numeral 11 indicates in general a boat and luggage carrier embodying the features of this invention which comprises a frame 12 of any suitable rigid construction including opposed longitudinally extending side members 13 provided with transversely aligned and longitudinally spaced vertical slots 14. The carrier 11 further comprises a plurality of transversely extending means in the form of struts 15 having end members 16 (FIG. 3) secured in any suitable manner at each end thereof which are provided with tapped apertures for receiving bolts 17. Each bolt 17 extends through one of the slots 14 in a side member 13, whereby the several struts 15 may be adjusted vertically relative to the side members 13 and rigidly secured thereto in any selected adjusted position.

Mounted upon the several transversely extending struts 15 and secured thereto in any suitable manner is a deck or sealing platform 18 which may be made of plywood or metal, such as tempered aluminum sheeting. The vertical adjustability of the laterally extending struts 15 permits the deck or platform 18 to be so disposed as to accommodate boats of different gunnel contours.

To assure sealing engagement between the adjustable platform 18 and the gunnels of a boat mounted in inverted position thereon, sealing means are provided in the form of gasket means of any suitable resilient material mounted on the platform comprising longitudinally extending gaskets 19 secured or adhered in any desired manner to the platform adjacent its forward and lateral edges and a similar transversely extending gasket 21 adjacent the rear end of the platform. To accommodate boats of different lengths, this transverse gasket 21 may be releasably mounted in any suitable manner for selective adjustment longitudinally of the platform, or it may be permenently secured to the latter and a temporary gasket provided for attachment to the platform for cooperation with the upper edge of the transom of the particular boat being mounted thereon as determined by the length of that boat, or since standard lengths for such boats are ten, twelve and fourteen feet, three such transverse gaskets 21 may be mounted with two feet spacings.

Rotatably mounted in any suitable manner on a transversely extending shaft 22 which is supported by the frame side members 13 adjacent their rear ends are a pair of rollers 23 for cooperation with the gunnels of a boat as the same is being mounted or removed from the carrier 11 in a manner to be later explained in detail. For purposes of guiding the boat as it is moved longitudinally on the rollers 23, the atter may be flanged, as shown in FIG. 6.

As best seen in FIGS. 4, 5 and 7, it is preferred that any boat, indicated generally by reference numeral 24, which is to be transported by means of the instant carrier 11 be provided with a wheel 25 upstandingly mounted in any suitable manner adjacent its prow. This will facilitate relative movement between the boat and the carrier in a manner later to be described, and the latter therefore must be constructed to accommodate such a prow wheel 25 when the boat is disposed on the carrier in traveling position. To this end, the platform or deck 18 is provided with a suitable aperture adjacent its forward end which accommodates such a prow wheel and below which is mounted in any desired manner a wheel-receiving bracket 26. This bracket 26 is provided with outwardly and upwardly sloping side walls 27 which function to guide the prow wheel 25 into central longitudinal alignment in the bracket to insure proper cooperation between the gunnels of the boat and the longitudinally extending gaskets 19, and also provide clearance for the prow wheel to permit tilting up of one side of the boat for the purpose hereinafter noted.

The modified carrier illustrated in FIG. 8 is identical to that hereinbefore described except for the construction of the deck or platform. In this modification of FIG. 8, the platform is indicated by reference numeral 28 and comprises two or more longitudinally extending slats 29 supported by the adjustable struts 15 and suitable flexible cover means in the form of a sheet 31 of canvas, plastic film, or the like, secured to the undersurfaces of the slats 29.

The boat and luggage carrier of either modified form is provided with brackets 32 (FIGS. 4–6) secured in any suitable manner is longitudinally spaced relationship to each other on the side frame members 13 and adapted to be detachably mounted in well-known manner on the top of any hard-top automobile 33. In addition, upon mounting the carrier on a sedan, it is preferred that a bumper brace 34 interconnect the rear bumper of the automobile and the rear end of the carrier in the manner illustrated in FIG. 5.

When so mounted upon the vehicle, the boat and luggage carrier may have its deck or platform 18 or 28 readily adjusted to accommodate the gunnel contour of any particular boat 24 which it is desired to mount thereon by the simple expedient of properly vertically positioning the several transverse struts 15 relative to the side frame members 13. One-man mounting and removal of a boat on the carrier is a simple matter. The boat is brought to an inverted position with its rear in substantial alignment longitudinally with the vehicle and its prow disposed laterally adjacent the rear end thereof. Movement of the boat to such a position obviously is facilitated if it is provided with the prow wheel 25, since the operator then can trundle the boat thereto by lifting the transom and moving the boat in the manner of a wheelbarrow.

When the boat is so disposed, the operator may lift its prow to the position illustrated in FIG. 4 and swing the boat laterally to dispose the inverted gunnels on the rollers 23. Then by returning to the stern of the boat, he may lift the latter and move it forwardly on the rollers 23 into its traveling position of FIG. 5. During such movement, the prow wheel 25 will roll along the deck 18 or 28 to support the forward end of the boat and the gunnels of the boat will be supported and guided by the flanged rollers 23. As the boat reaches its forwardmost or traveling position, the prow wheel 25 will drop into the bracket 26, the slanting side walls 27 of the latter assuring central positioning of the boat relative to the platform of the carrier. The gunnels of the boat then will be resting upon the longitudinally extending gaskets 19 and the edge of the transom will be disposed on the transverse gasket 21 to completely seal the compartment thus defined by the boat and the platform. As previously indicated, the transversely extending gasket 21 may be repositioned longitudinally of the platform as required to thus sealingly cooperate with the boat transom.

In order to place any luggage, or the like in the compartment thus provided, it is necessary only to tilt the boat by lifting one side to a position similar to that illustrated in FIG. 7 and temporarily prop the same therein in any suitable manner. After any luggage thereafter is placed upon the platform 18 or 28, dropping of the raised edge of the boat to dispose the same in its traveling position of FIG. 5 provides a completely weatherproof compartment or enclosure. In this connection, whether or not the compartment thus provided is so employed, the platform or deck 18 or 28 prevents air turbulence and, together with the inverted boat, functions in a manner of an airfoil to assure minium drag on the vehicle during forward movement thereof.

It also will be appreciated that when parked the carrier and the boat, if one edge of the boat is propped up in a tited position, may be used as sleeping quarters, if desired, and it will be clearly evident that one-man removal of the boat from the carrier may be accomplished by reversing the previously described procedure for mounting the same thereon.

It is thought that the invention and many of the attendant advantages will be understood from the foregoing description, and it will be apparent that various changes may be made in the form, constructions, and arrangement of the parts without departing from the spirit and scope of the invention or sacrificing all of its material advantages, the forms hereinbefore described being marely preferred embodiments thereof.

I claim:

1. A boat and luggage carrier, comprising a frame attachable to the top of a stock automobile, a platform flexible in a vertical direction mounted on said frame to receive a standard small boat having gunnels in inverted traveling position thereon and cooperating with said boat to provide a compartment for luggage, and means adjustably mounted on said frame to support said platform and to vertically shift a portion of said platform relative to the remaining portion and said frame to vary the longitudinal sectional contour of said platform to conform to the particular contour of the gunnels of the boat being carried.

2. In a boat and luggage carrier according to claim 1, resilient gasket means mounted on said platform for sealing engagement with the gunnels of the boat.

3. A boat and luggage carrier according to claim 1, wherein said platform comprises a sheet of tempered aluminum.

References Cited

UNITED STATES PATENTS

| | | | |
|---|---|---|---|
| 2,597,656 | 5/1952 | Martin | 224—42.1 |
| 2,654,515 | 10/1953 | Svoboda | 224—42.1 |
| 2,722,326 | 11/1955 | Conroy | 214—450 |
| 3,095,129 | 6/1953 | Kerr | 224—42.1 |
| 3,185,518 | 5/1965 | Zentner | 224—42.1 |
| 3,301,449 | 1/1967 | Tope | 224—42.1 |
| 3,311,246 | 3/1967 | Jones | 214—450 |
| 3,324,487 | 6/1967 | Hiett | 9—1 |

GERALD M. FORLENZA, Primary Examiner

R. B. JOHNSON, Assistant Examiner

U.S. Cl. X.R.

214—450